(12) United States Patent
Corbille et al.

(10) Patent No.: US 12,710,609 B2
(45) Date of Patent: Aug. 18, 2026

(54) FIBER-OPTIC APPARATUS

(71) Applicant: CORNING RESEARCH & DEVELOPMENT CORPORATION, Corning, NY (US)

(72) Inventors: Christophe Joseph Marie Corbille, Saint Nicolas de Redon (FR); Michel Teva Menguy, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 265 days.

(21) Appl. No.: 18/384,610

(22) Filed: Oct. 27, 2023

(65) Prior Publication Data

US 2024/0142735 A1 May 2, 2024

Related U.S. Application Data

(60) Provisional application No. 63/421,317, filed on Nov. 1, 2022.

(51) Int. Cl.
*G02B 6/44* (2006.01)

(52) U.S. Cl.
CPC ......... *G02B 6/4453* (2013.01); *G02B 6/4446* (2013.01)

(58) Field of Classification Search
CPC ... G02B 6/4446; G02B 6/4453; G02B 6/4455
See application file for complete search history.

(56) References Cited

U.S. PATENT DOCUMENTS

| | | | | |
|---|---|---|---|---|
| 5,189,723 | A * | 2/1993 | Johnson | G02B 6/4454 385/134 |
| 5,515,472 | A | 5/1996 | Mullaney et al. | |
| 5,754,723 | A * | 5/1998 | Fremgen | G02B 6/445 385/136 |
| 6,226,436 | B1 * | 5/2001 | Daoud | G02B 6/4442 385/134 |
| 6,453,107 | B1 | 9/2002 | Daoud | |
| 6,507,691 | B1 | 1/2003 | Hunsinger et al. | |

(Continued)

FOREIGN PATENT DOCUMENTS

| | | | |
|---|---|---|---|
| EP | 1129380 | A1 | 9/2001 |
| EP | 1137962 | A1 | 10/2001 |

(Continued)

OTHER PUBLICATIONS

Extended European Search Report, European patent application No. 23206745.4; dated Apr. 4, 2024; 7 pages; European Patent Office.

*Primary Examiner* — Charlie Y Peng
(74) *Attorney, Agent, or Firm* — Tamika A. Crawl-Bey

(57) ABSTRACT

A fiber-optic apparatus is disclosed, comprising: a housing defining an interior; an access means for accessing the interior of the housing; at least one opening for a fiber optic cable; an organizer for managing one or more optical fibers in the closure, the organizer comprising an organizer tray configured to receive one or more fiber-optic storage trays; and one or more support rails configured to retain the organizer tray at one of a plurality of discrete levels with respect to a base of the closure, wherein the organizer tray can be moved between the discrete levels; the fiber-optic apparatus further comprising: a storage portion adjacent the organizer configured to retain unused optical fibers.

22 Claims, 8 Drawing Sheets

(56) References Cited

U.S. PATENT DOCUMENTS

| | | | | |
|---|---|---|---|---|
| 7,428,363 | B2 * | 9/2008 | Leon .................. | G02B 6/44528 385/134 |
| 7,970,249 | B2 * | 6/2011 | Solheid ................ | G02B 6/4477 385/134 |
| 2004/0011546 | A1 * | 1/2004 | Kim ..................... | H02G 3/0437 174/50 |
| 2006/0193587 | A1 * | 8/2006 | Wittmeier ............ | G02B 6/4445 385/135 |
| 2013/0094826 | A1 | 4/2013 | Marsac et al. | |
| 2015/0168663 | A1 | 6/2015 | Aznag et al. | |
| 2016/0116697 | A1 | 4/2016 | Kostecka et al. | |
| 2017/0045701 | A1 | 2/2017 | Diepstraten et al. | |
| 2018/0129008 | A1 * | 5/2018 | Gonzalez Covarrubias ................ | G02B 6/4455 |
| 2021/0294053 | A1 | 9/2021 | Qing | |
| 2022/0082773 | A1 | 3/2022 | Sedor et al. | |

FOREIGN PATENT DOCUMENTS

| | | | |
|---|---|---|---|
| EP | 2508928 | B1 | 8/2015 |
| EP | 3132298 | B1 | 8/2021 |
| JP | 10-260319 | A | 9/1998 |
| WO | 00/28364 | A1 | 5/2000 |
| WO | 00/28365 | A1 | 5/2000 |
| WO | 2000/057230 | A2 | 9/2000 |
| WO | 2020/223473 | A1 | 11/2020 |
| WO | 2020/242981 | A1 | 12/2020 |

* cited by examiner 16
12
124
104
118
14
102
122
20
100
10
106
30
120
18

FIBER-OPTIC APPARATUS

PRIORITY APPLICATION

This application claims the benefit of priority of U.S. Provisional Application Ser. No. 63/421,317 filed on Nov. 1, 2022, the content of which is relied upon and incorporated herein by reference in its entirety.

BACKGROUND

The present disclosure relates to the field of optical hardware and fiber-optic apparatuses. In particular, the technology of the disclosure relates to fiber-optic apparatuses for managing and connecting fiber-optic cables, including fiber-optic management equipment that optimizes optical fiber and optical fiber connection density.

Fiber-optic networks allow information to be transmitted via optical signals transmitted through optical fibers. Compared with traditional copper wiring, optical fibers allow transmission over greater distances with substantially less signal loss, provide a greater bandwidth, and do not suffer from electrical interference. Fiber-optic networks are particularly useful when providing long-distance communication and high bandwidth, so called “super-fast”, broadband internet.

Typically, in a fiber-optic network a fiber optic cable is run from the network operator to a consumer premises (an outside plant, or OSP, cable). At the consumer premises, this cable is then split into a number of separate fiber-optic cables, each providing network connections (inside plant, or ISP cables). Typically, this is done using a fiber-optic splitter, also known as an optical splitter or beam splitter.

The outputs of the beam splitters are typically for supplying individual consumer premises. For example, in this manner a fiber-optic broadband provider may lay a single fiber-optic cable to service a group of houses or business on a road or to service a block of flats. This cable may terminate in a street cabinet or wall terminal where the cable is split into a number of consumer fibers for servicing each individual house, business or flat.

To provide flexibility, for example because the number of premises subscribed to the fiber-optic broadband provider may change, the output fibers of the beam splitter are usually connected to the consumer fibers via fiber-optic connectors or connector adaptors. Many standard connector types exist, such as SC, LC, and MPO connectors. These connections also occur within the street cabinet or wall terminal, and allow an engineer to quickly connect or disconnect individual consumer fibers with the fiber-optic network.

Fiber-optic storage closures provide secure and cost effective storage for optical fibers, splices, splitters and other fiber-optic equipment. Such fiber closures also protect the optical fibers from becoming damaged by UV, impacts and moisture. Typical fiber closures have a number of slots for housing and retaining splice storage trays (also known as cassettes or fiber-optic management trays). Fiber-optic splice storage trays provide a junction between incoming and outgoing optical fibers which have been spliced together. A fiber-optic splice storage tray typically has a portion for locating splices, and/or or other fiber-optic components and a portion for storing excess fiber from the incoming and outgoing fibers.

In the field of optical fiber deployment, many connection boxes or fiber-optic closures are deployed on the network. These fiber-optic closures are typically either junction boxes, which connect two cables of identical capacity, or distribution boxes, which split an incoming single cable into two or more outgoing cables whilst maintaining the same number of incoming optical fibers as outgoing optical fibers. These fiber-optic closures can be installed underground, or aerially, on a pole, a wall or a wire.

Such fiber-optic storage closures that exist in the art have a number of drawbacks. They are often large and not compact, while providing poor access for engineers needing to work on the fibers (e.g. to splice or connect fibers) within. Splicing in the field is where engineers spend a large portion of their time. With increasing demand for fiber-optic technology, space for the optical fibers and other associated components is at a premium. Existing fiber closures and trays are relatively large compared with the density of fiber housed therein due to the connections of fibers requiring a coiling area for the unused excess lengths of fiber and a connection area for the fibers. There is also a need to minimize tight bending angles which puts additional constraints on how small closures and trays can be made. Additionally, multiple fiber-optic storage trays often have to be stacked to accommodate the required number of fiber-optic splices. The fibers then need to be routed in a complex manner between the trays. This can make access difficult for engineers needing to work on the fibers or the splices within, for maintenance purposes. In particular, the stacking of fiber-optic storage trays can make accessing and connecting unused optical fibers housed in a storage closure difficult. Furthermore, each time the splices or fibers are accessed there is a risk that the engineer may mistakenly disturb or damage the contents, leading to a loss of connection of the affected fibers.

SUMMARY

According to a first aspect, a fiber-optic apparatus is provided. The fiber-optic apparatus comprises: a housing defining an interior; an access means for accessing the interior of the housing; at least one opening for managing one or more optical fibers in the closure, the organizer comprising: an organizer tray configured to receive one or more fiber-optic storage trays; and one or more support rails configured to retain the organizer tray at one of a plurality of discrete levels with respect to a base of the closure, wherein the organizer tray can be moved between the discrete levels; the fiber-optic closure further comprising: a storage portion adjacent the organizer configured to retain unused optical fibers.

This provides an apparatus which allows for a modular configuration. The usable volume of the apparatus may be separated into two volumes. A first volume is available for in-use optical fibers retained in fiber-optic storage trays received on the organizer tray. A second volume defined by the storage space is configured to retain unused fibers. A user or operator is able to optimize the usable volume of the apparatus by modifying the arrangement of the organizer. In particular, by moving the organizer up or down on the support rails, a user can modify the proportion of the usable volume available for in-use optical fibers. More specifically, by moving the organizer tray down on the support rails, the volume available for in-use optical fibers is increased and the volume available for unused optical fibers is decreased. Thus, the increased volume for in-use optical fibers allows for one or more additional fiber-optic storage trays to be added to the organizer. The unused optical fibers which were previously received in the storage portion can be connected and housed in the one or more additional fiber-optic storage trays being added to the organizer. The access means may be movable between an open position in which the interior of the housing of the apparatus can be accessed, and a closed position in which the interior of the housing cannot be accessed.

Optionally, the one or more support rails comprise one or more supports at each of the plurality of levels, each support projecting from its corresponding support rail to support the organizer tray.

The one or more supports of the support rail advantageously provide support to the organizer tray. The one or more supports further help to define the plurality of discrete levels between which the organizer tray can move. The one or more supports can prevent vertical downward movement of the organizer tray.

Optionally, each support can transition between a support position, in which the support can engage with the organizer tray to support the organizer tray, into a disengaged position, in which the support does not support the organizer tray.

In particular, in the support position, each support of the plurality of supports can engage with the organizer tray to support the organizer tray at one of the plurality of discrete levels. When a support at one of the plurality of support levels is in the support position, the support may prevent the organizer tray from passing to a lower discrete level. When one or more supports at the lowest discrete level of the organizer are into the support position, the organizer tray may be prevented from falling into the storage portion adjacent the organizer. When a support at a discrete level is in the disengaged position, the organizer tray is able to pass the support. The organizer tray is then able to move to a lower discrete level.

Optionally, the supports are removable or frangible.

Configuring the supports to be removable or frangible may advantageously enable the support to transition between a support position, in which the support can engage with the organizer tray to support the organizer tray, into a disengaged portion, in which the support does not support the organizer tray. The organizer tray can therefore be more easily moved from one discrete level to another discrete level. In particular, a user can simply remove or break the one or more supports at a discrete level such that the organizer tray is no longer supported at this level in order to move the organizer tray to a lower discrete level. In embodiments in which the supports are removable, the movement of the organizer tray is reversible. In particular, the organizer tray can also be moved from lower discrete levels to higher discrete levels. More specifically, the supports that were previously removed from a higher discrete level in order to lower the organizer tray and accommodate further fiber-optic storage trays can be refitted to once again support the organizer tray at the higher discrete level. In other embodiments in which the supports are frangible, the movement of the organizer tray is not reversible. In other words, once the one or more supports at a higher discrete level are broken to move the organizer tray to a lower discrete level, the organizer tray cannot be returned to the higher discrete level. Arranging the supports to be frangible can result in simpler and more cost effective manufacturing of the apparatus and in particular, the organizer. More specifically, arranging the supports to be frangible allows the one or more support rails to be manufactured in a single piece. This also simplifies assembly of the apparatus and organizer as there are fewer parts in the assembly.

Optionally, the organizer comprises a plurality of retaining members for retaining the organizer tray with respect to the one or more support rails.

The retaining members advantageously secure the organizer tray to the organizer in the apparatus. The retaining members may allow the organizer tray to be quickly locked into place with respect to the support rails. The retaining member may also hold the organizer tray in place during normal operation of the fiber-optic apparatus. This arrangement can ensure that the optical-fibers and other components retained on the organizer tray are not disturbed if the apparatus is inadvertently dislodged by vibrations or some other disturbance. The retaining members can also help to retain the organizer tray during routine maintenance by an operator. Furthermore, these retaining members also help to keep the interior of the fiber-optic apparatus organized and tidy, increasing splice and optical fiber density and reducing the likelihood of operator error when working on the optical fibers. The organizer may comprise one or more retaining members at each of the plurality of discrete levels of the organizer. Thus the retaining members may act cooperatively with the supports to prevent vertical movement of the organizer tray and retain the organizer tray at one of the plurality of support rails. The retaining members may be resilient. The retaining members may be shaped or configured to allow easy insertion of the organizer tray onto the support rails.

Optionally, the retaining members are clips, clasps, fasteners, latching mechanisms or any other suitable retention mechanism.

Where the retaining members are clips, clasps or latching mechanisms, the retaining members may be shaped or configured to only allow removal of the organizer tray from the support rails through the exertion of sufficient force. Such an arrangement prevents the organizer tray from becoming inadvertently removed. This arrangement also has the advantage that no tools are required to remove the organizer tray. This can facilitate access for an operator carrying out routine maintenance on the apparatus or the optical fibers housed therein. In embodiments where the retaining members are fasteners, the retaining members can ensure more secure retention of the organizer tray on the support rails.

Optionally, each of the retaining members is on one of the one or more support rails.

This arrangement can provide a more robust arrangement than if the retaining members were on the organizer tray. In particular, during routine maintenance of the apparatus, the organizer tray needs to be handled by an operator to add new fiber-optic storage trays. The likelihood of the retaining members becoming damaged or broken is thereby reduced by the inclusion of these on the one or more support rails.

Optionally, each of the retaining members has a corresponding engagement feature on the organizer tray.

The engagement features on the organizer tray may interact with their corresponding retaining members to help retain the organizer in place on the support rails. The engagement features may be protrusions. The engagement features may be a portion of a fastener configured to interact with another portion of a fastener constituting the respective retaining member.

Optionally, the organizer tray is removable from the fiber-optic apparatus.

This arrangement can further facilitate access to the contents of the apparatus for an operator carrying out routine maintenance or repairs. In particular, the entire organizer tray and fiber-optic management tray assembly can be removed from the apparatus. As discussed above, fiber optic apparatus such as fiber closures are typically installed underground or aerially and offer poor access for operators needing to work on the fibers. The removable organizer tray therefore makes it easier for the operator to work on the optical fibers received in the storage trays as they can be worked on outside of the apparatus where there is more space available. It is also easier for an operator to access the unused optical fibers received in the storage portion adjacent the organizer when the organizer tray is removed.

Optionally, the one or more support rails are resilient.

Configuring the one or more support rails to be resilient can facilitate disengagement of the retaining members. This can allow for the organizer tray to be more easily moved between the discrete levels as well as full removal of the organizer tray from the fiber-optic apparatus. More specifically, an operator can exert a force on the top of the support rails such that they are resiliently deformed outwards and the retaining members disengage with the organizer tray to allow the tray to be moved with respect to the support rails.

Optionally, the organizer comprises a centering mechanism for centering the organizer tray on the one or more support rails.

The centering mechanism may ensure that the organizer tray is retained in a specific longitudinal position with respect to the support rails. This in turn may help to maximize the usable space of the fiber-optic apparatus. Additionally, this may ensure repeatability in the location of the organizer tray with respect to the support rails. This repeatability may facilitate access and maintenance of the apparatus by an operator. The centering mechanism can also prevent unwanted longitudinal movement of the organizer tray which could damage the optical fibers housed in the apparatus. The centering mechanism may have a centering feature on the one or more support rails. The centering feature on the one or more support rails may be one or more side edge of the one or more support rails.

Optionally, the centering mechanism comprises a centering feature on the organizer tray.

The centering feature on the organizer tray may engage with a corresponding centering feature on the one or more support rails to center the organizer tray. The centering feature on the organizer tray may be one or more protrusions on the organizer tray.

Optionally, the organizer comprises a first tape configured to retain the one or more fiber-optic storage trays on the organizer tray.

In order to access the fiber-optic storage trays, an operator must first remove the first tape. The tape may advantageously prevent any relative motion between the organizer tray and the one or more fiber-optic storage trays received on the organizer. This may prevent the optical fibers stored in the one or more fiber-optic storage trays from becoming damaged. The first tape may be of different lengths to accommodate different sizes of fiber-optic storage trays. The first tape may comprise a hook and loop fastener to join both ends of the tape. Where the first tape comprises a hook and loop fastener, the first tape may have increased adjustability to retain different numbers of fiber-optic storage trays on the organizer tray. The hook and loop fastener may be Velcro®. The hook and loop fastener may cover substantially the entirety of the first tape.

Optionally, the first tape is configured to retain the plurality of fiber-optic storage trays as a bundle.

This arrangement may be advantageous for preventing the optical fibers stored in the plurality of fiber-optic storage trays from becoming dislodged or damaged. In particular, the first tape may help to prevent any relative motion between each of the plurality of fiber-optic storage trays received on the organizer. The first tape may also help to keep the plurality of fiber-optic storage trays connected throughout use of the apparatus or during routine maintenance, particularly where the organizer tray is removed from the apparatus. This is particularly advantageous since fiber-optic storage trays do not typically have any retaining features for connecting multiple fiber-optic storage trays to one another.

Optionally, the organizer tray comprises cutouts to receive the first tape at different positions on the organizer tray.

The cutouts allow the first tape to be threaded through the organizer tray. The cutouts at different positions on the organizer tray may allow the first tape to be threaded through the organizer tray at different positions. This arrangement may advantageously allow the first tape to retain one or more optical fiber storage trays of different sizes or in different configurations.

Optionally, the organizer comprises a second tape configured to retain the organizer tray and the one or more fiber-optic storage trays received thereon on the one or more support rails.

The second tape may provide additional security for retaining the organizer tray on the one or more support rails. In particular, the second tape may prevent the organizer tray from falling out of the apparatus if the retaining members have become disengaged. In order to access the fiber-optic storage trays received on the organizer tray, an operator must first open or detach the second tape and then open or detach the first tape. The second tape may comprise a hook and loop fastener to join both ends of the second tape. Where the second tape comprises a hook and loop fastener, the second tape may have increased adjustability to retain different numbers of fiber-optic storage trays on the organizer tray. The hook and loop fastener may be Velcro®. The hook and loop fastener may cover substantially the entirety of the second tape.

Optionally, each of the one or more support rails comprises an opening for the second tape.

The opening in each of the one or more support rails may provide a more secure retention of the organizer tray on the one or more support rails. The features of this retention are discussed above in respect of the second tape.

Optionally, the organizer further comprises a divider corresponding to each of the one or more fiber-optic storage trays.

The divider corresponding to each of the one or more fiber-optic storage trays separates one tray from the adjacent tray. The divider may act as a 'lid' for its corresponding fiber-optic storage tray. When multiple fiber-optic storage trays are stacked on the organizer tray, each adjacent fiber-optic storage tray may have a divider The divider may have substantially the same shape and size as the base of its corresponding fiber-optic storage tray.

Optionally, the height of a discrete level is substantially the same as the height of a fiber-optic storage tray.

This arrangement may maximize the usable space of the apparatus. In particular, by arranging the height of a discrete level to be substantially the same as the height of a fiber-optic storage tray, the gap between adjacent stacked fiber-optic storage trays may be minimized. This can help to maximize the number of fiber-optic storage trays that can be received on the organizer tray.

Optionally, the organizer further comprises a fixing means for fixing the one or more support rails in the apparatus.

The fixing means may be between the one or more support rails and the base of the apparatus. The fixing means may ensure that the support rails remain fixed to the apparatus during normal use and maintenance of the apparatus. Furthermore, the fixing means may prevent the support rails from being removed from the apparatus when the organizer tray is moved between discrete levels or removed from the apparatus. The fixing means may be one or more screws.

Optionally, the apparatus is weather sealed. This may prevent ingress of moisture, UV light and debris which could damage the components housed within the apparatus. The weather sealing may be provided by sealing means located between the access means and the housing of the apparatus. The sealing means may be in the form of first sealing means located at the intersection between the housing of the apparatus and the access means. This may also optionally include sealing means located at a hinge between the access means and the housing of the apparatus, in embodiments where a hinge is used. In some embodiments, the access means may be a first access means and the apparatus may further comprise a second or further access means. In such embodiments, the sealing means may further comprise a second sealing means provided between the first, second and further access means, if present, for independently engaging each of the first, second and further access means when in their closed positions. The sealing means may be any appropriate sealing material, such as a rubber seal.

Optionally, the storage portion is between the organizer tray and the base of the apparatus.

This has the advantage of the storage portion being independent of the organizer. This allows an operator to be able to work on the fibers housed in the one or more fiber-optic storage trays received on the storage portion without disturbing the unused optical fibers stored in the storage portion. In particular, the organizer tray or indeed the organizer as a whole, can be removed from the apparatus without interfering with the storage portion or indeed the unused optical fibers housed therein.

Optionally, the organizer tray is configured to receive the one or more fiber-optic storage trays one on top of one another in a stack.

Arranging the one or more fiber-optic storage trays to be received on the organizer tray in a stack allows for optimizing the usable volume of the apparatus. Furthermore, such an arrangement provides a neat storage solution which can easily be managed and configured by an operator working on the apparatus.

Optionally, the organizer tray is configured to receive the one or more fiber-optic storage trays in two or more stacks.

This allows for further optimizing the usable volume of the apparatus. Such an arrangement can be useful when the length or width of a fiber-optic storage tray is at least or less than half of the length or width of organizer tray, such that two or more fiber-optic storage trays can be received next to one another on the organizer tray.

According to a second aspect, an organizer for managing one or more optical fibers in an apparatus is provided, the organizer comprising: an organizer tray configured to receive one or more fiber-optic storage trays; and one or more support rails configured to be inserted into the apparatus, the support rails configured to retain the organizer tray at one of a plurality of discrete levels with respect to a base of the apparatus, wherein the organizer tray can be moved between the discrete levels.

The second aspect may be implemented with any of the features of the first aspect described above.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION OF THE INVENTION

As used herein, the terms "side", "top", "bottom", "front", "back" and other terms used to describe relative positions of the components of apparatuses according to the invention, refer to the container in an upright position with the access opening at the top. When describing containers according to the present invention, these terms are used irrespective of the orientation of the apparatus being described. The "bottom" of the apparatus refers to the side of the container opposite the "top" of the container.

The term "height" is used herein to refer to dimensions extending between the top and the bottom. The term "width" is used herein to refer to dimensions extending between two sides. The term "length" is used herein to refer to dimensions extending between the front and the back. Height, width and length are orthogonal to each other.

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to like components or parts.

Embodiments described in relation to the figures relate to an apparatus for housing one or more fiber-optic storage trays, these being trays that include one or more splice storage portions, and/or one or more optical splitter portions. However, it should be noted that any aspects of these embodiments could be implemented as an alternative tray type such as a WDM tray that also includes one or more splice storage portions. That is, an apparatus as described herein may house one or more fiber-optic storage trays and may also include portions for holding or storing other fiber-optic components such as WDM components, including but not limited to, multiplexers or de-multiplexers.

Figure 1:
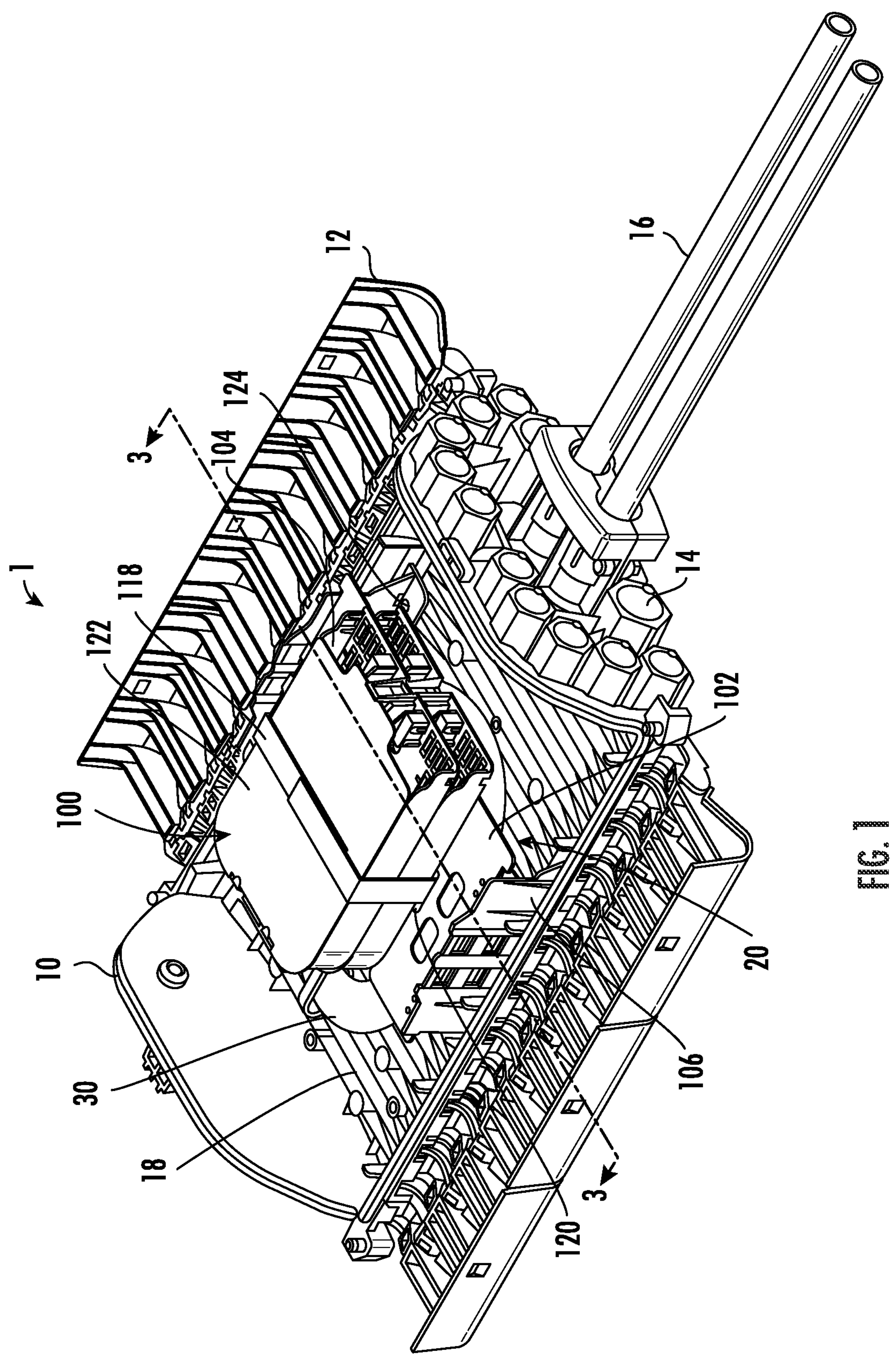
FIG. 1 illustrates a perspective view of an exemplary fiber-optic apparatus according to an embodiment with two fiber-optic storage trays received on the organizer tray.

FIG. 1 illustrates a perspective view of an exemplary fiber-optic apparatus according to an embodiment with two fiber-optic storage trays received on the organizer tray.

As illustrated, the apparatus 1 comprises a housing 10 defining an interior of the apparatus, access means 12 for accessing the interior of the housing 10, at least one opening 14 for a fiber optic cable 16, an organizer 100 for managing one or more optical fibers in the apparatus 1 and a storage portion 20 adjacent the organizer configured to retain unused optical fibers 30.

The housing 10 of the apparatus 1 has a base 18, a front wall and a back wall. The interior of the housing 10 defines a volume for storing optical fibers and other fiber-optic equipment. As can be seen in this exemplary embodiment, the access means 12 comprises two doors that are hingedly connected to the housing 10. The doors are shown in a first open position in which the interior of the housing 10 can be accessed. The doors are movable from between this first open position to a second closed position in which the interior of the housing 10 cannot be accessed. In alternative examples, the access means may comprise only one door or three or more doors. The doors may also be slidably attached to the housing 10 or attached by another other suitable mechanism that allows the housing 10 to be opened and closed.

The apparatus 1 comprises 14 openings 14 in the front wall of the housing. These openings 14 may each receive a fiber-optic cable 16. In this exemplary embodiment, only two of the 14 openings 14 have a fiber-optic cable 16 inserted therein. It will be appreciated that in other embodiments, the apparatus 1 may comprise any number of openings 14. Furthermore, any number of the openings 14 of the apparatus 1 may have a fiber-optic cable inserted therein. In other example embodiments, the openings 14 of the apparatus 1 may be in any suitable location on the apparatus 1 such as the back wall or the base 18. Each one or the at least one opening 14 may also be configured to receive two or more fiber-optic cables. This may depend on the type of cable and the attachment used between the fiber-optic cable 16 and the housing 10.

Figure 2:
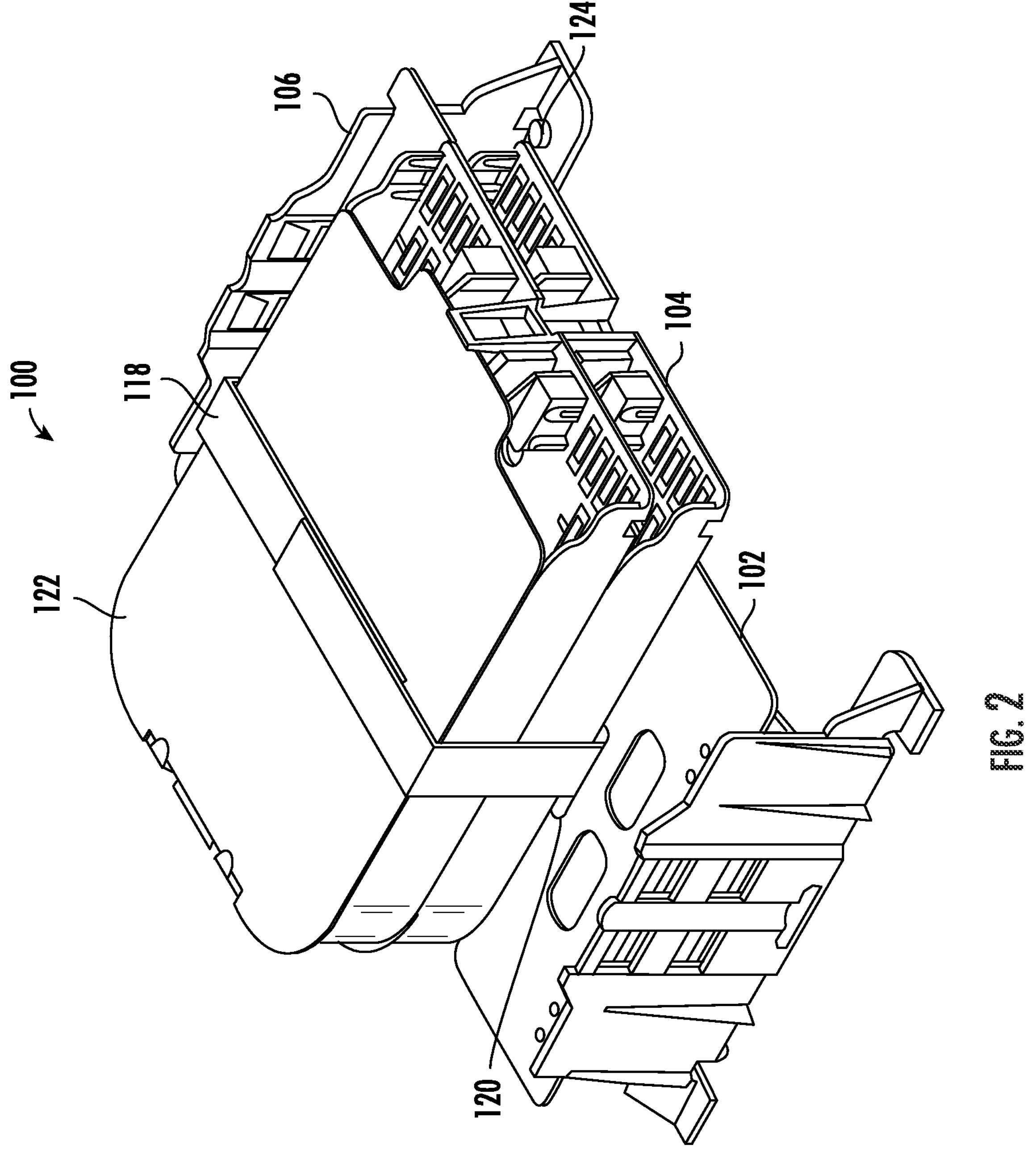
FIG. 2 illustrates a perspective view of an exemplary organizer according to an embodiment with two fiber-optic storage trays received on the organizer tray.

As shown in FIG. 1 as well as in FIG. 2 in which the organizer is isolated from the apparatus 1, the organizer 100 comprises an organizer tray 102 and two support rails 106 which are supporting and retaining the organizer tray 102 within the apparatus 1. The organizer tray supports two fiber-optic storage trays 104 which are retained on the organizer tray 102 with a first tape 118. The first tape 118 circumscribes the fiber-optic storage trays 104 to retain them as a bundle. In this example, the organizer tray 102 is retained on the support rails 106 such that the open ends of the fiber-optic management trays 104 face the openings 14 in the housing configured to receive fiber-optic cables 16. However, it will be appreciated that in alternative embodiments, the organizer tray 102 may be retained on the support rails 106 such that the open ends of the fiber-optic management trays 104 face away from the openings 14 in the housing configured to receive fiber-optic cables 16. For example, the open ends of the fiber-optic management trays 104 may be facing the back or side walls of the housing 10. In some embodiments, the open ends of the fiber-optic management trays 104 retained on the organizer tray 102 may be facing in different directions. The organizer tray 102 comprises cutouts 120 which allow the first tape 118 to be threaded through the organizer tray 102 such that the fiber-optic management trays 104 are retained on the organizer tray 102. Each of the fiber-optic storage trays 104 has a divider 122 which acts as a lid and separates the optical fibers housed in each of the fiber-optic storage trays 104. The support rails 106 are fixed to the base 18 of the housing 10 of the apparatus 1 by a fixing means 124 in the form of screws.

In this example, the organizer 100 comprises one organizer tray 102 and two support rails 106. However, it will be appreciated that the organizer may comprise a plurality of organizer trays 102 and any number of support rails 106 suitable for supporting and retaining the one or more organizer trays 102 in the apparatus 1. In the illustrated embodiment the organizer tray 102 is substantially planar, however the organizer tray 102 may also have a recessed portion for accommodating the one or more fiber-optic storage trays 104. As illustrated in this example, the organizer 100 comprises two support rails 106, one on either side of the organizer tray 102. In alternative embodiments, the one or more support rails 106 may be disposed at any suitable location around the organizer tray 102.

In the illustrated example, the support rails 106 are fixed to the base 18 of the housing 10 of the apparatus 1 by a fixing means in the form of screws at either end of each support rail 106. It will be appreciated that any number of fixing means 124 may be used at any location on the support rails 106 to fix the support rails 106 to the housing 10. Although screws are used in this example, it will be appreciated that alternative fixing means 124 may also be used.

In the apparatus 1 illustrated in FIG. 1, the storage portion 20 is adjacent the organizer 100 and is retaining a coil of unused optical fibers 30. As illustrated in this embodiment, the storage portion 20 is between the base 18 of the housing 10 and the organizer 100. The depth of the available storage space is therefore defined by the height of the organizer tray 102 relative to the base 18 of the housing 10. Alternatively, the storage portion 20 may be configured in a different location of the housing 10 that does not interfere with the functionality of the organizer 100. Although the storage portion 20 is illustrated here with a coil of unused fibers 30, there may be no unused fibers 30 in the storage portion 20 or there may be two or more coils of unused fibers 30.

FIG. 2 illustrates a perspective view of an exemplary organizer according to an embodiment with two fiber-optic storage trays received on the organizer tray.

FIG. 2 shows an identical view of the organizer 100 to that of FIG. 1, but in isolation of the rest of the apparatus 1. Therefore, the features of the organizer 100 and apparatus 1, discussed above in respect of FIG. 1 also apply to the organizer 100 and apparatus 1.

Figure 3:
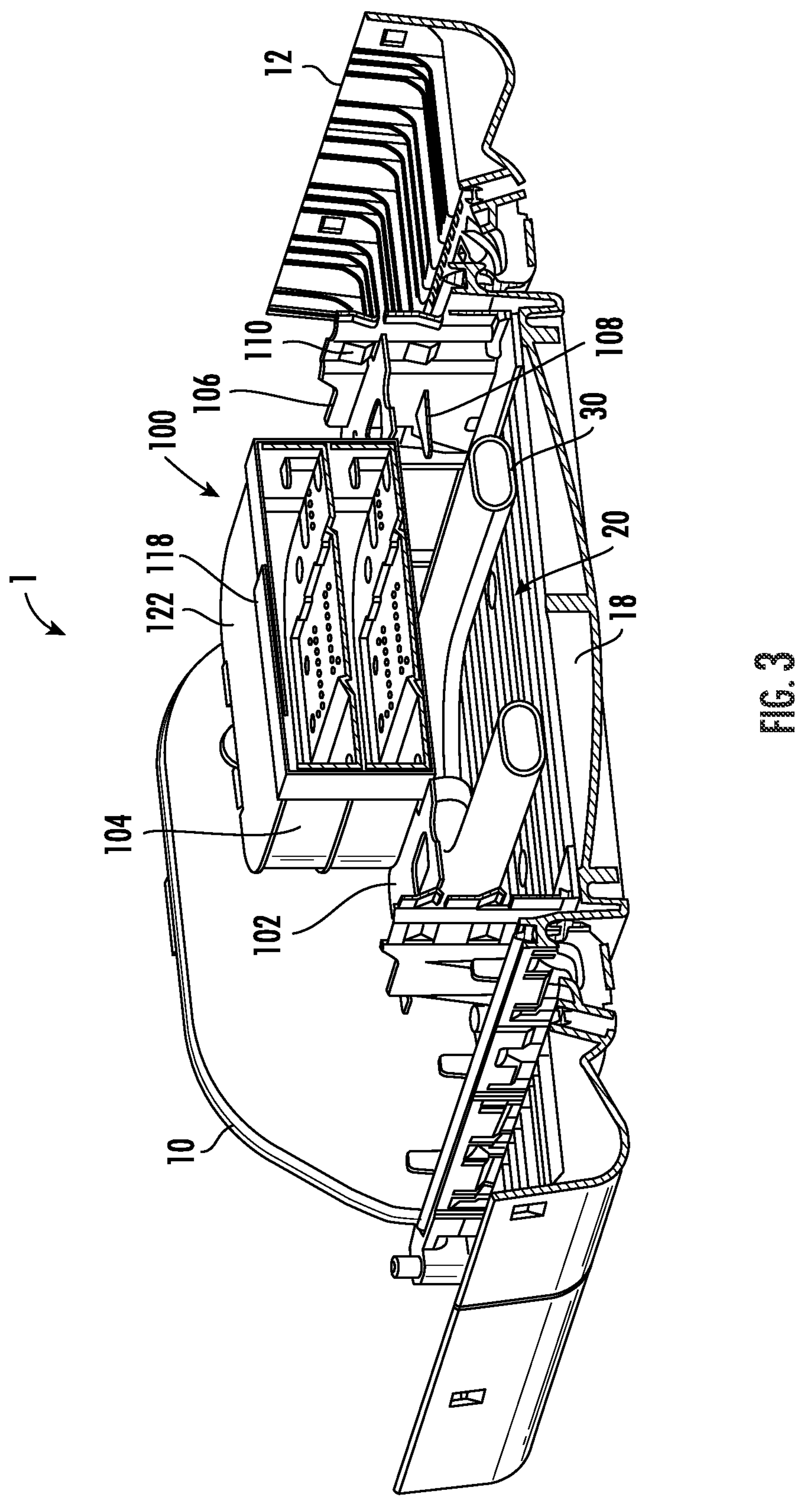
FIG. 3 illustrates a perspective cross sectional view along line 3-3 of an exemplary fiber-optic apparats according to an embodiment with two fiber-optic storage trays received on the organizer tray.

FIG. 3 illustrates a perspective cross sectional view along line 3-3 of an exemplary fiber-optic apparatus according to an embodiment with two fiber-optic storage trays received on the organizer tray.

For brevity, only the features of the apparatus 1 and the organizer 100 revealed by this view which have not been mentioned previously will be discussed. However, it should be noted that that the features of the apparatus 1 and organizer 100 discussed above in respect of FIGS. 1 and 2 also apply to the apparatus 1 and organizer 100 of FIG. 3.

In this view, the retaining members 110 and the supports 108 can be more clearly seen. In this example embodiment, each of the two support rails 106 comprises two retaining members 110 and two supports 108. However, it will be appreciated that each support rail 106 may have any suitable number of retaining members 110 and supports 108. For example, each support rail 106 may only have one retaining member 110 or more than two retaining members 110. Each support rail 106 may also have only one support 108 or more than two supports 108. Each support rail 106 may also have a different number of retaining members 110 as well as a different number of supports 108. As shown in FIG. 3, the retaining members 110 are located towards the center the support rails 106. In alternative embodiments, the retaining members 110 may be located towards the edges of the support rails 106. In FIG. 3, the supports 108 are located towards the edges of the support rails 106. In alternative embodiments, the supports 108 may be located towards the center of the support rails 106.

In FIG. 3, the retaining members 110 are clips. Alternatively, the retaining members 110 may be clasps, fasteners, latching mechanisms or any other suitable retention mechanism. In this example, the supports 108 are frangible tongue shaped protrusions which extend from the side wall of the support rails towards the center of the apparatus. Alternatively, the supports 108 may have any suitable shape for supporting the organizer tray 102. The supports 108 may also be removable components which can be fixed to the support rails 106. The supports 108 define the discrete levels of the organizer. In the example of FIG. 3, there are two discrete levels. However, it will be appreciated that apparatuses 1 and organizers 100 according to the invention may have a plurality of supports 108 defining any number of discrete levels. The organizer tray 102 is at the highest of the two discrete levels. As will be appreciated from the discussion of the subsequent figures, the organizer tray 102 may also be retained at the lower of the two discrete levels or indeed any intermediate discrete level where the organizer 100 has more than two discrete levels.

Furthermore, the view of FIG. 3, shows the first tape 118 passing through cutouts 120 in the organizer tray 102 and circumscribing the bundle of fiber-optic management trays 104.

Figure 4:
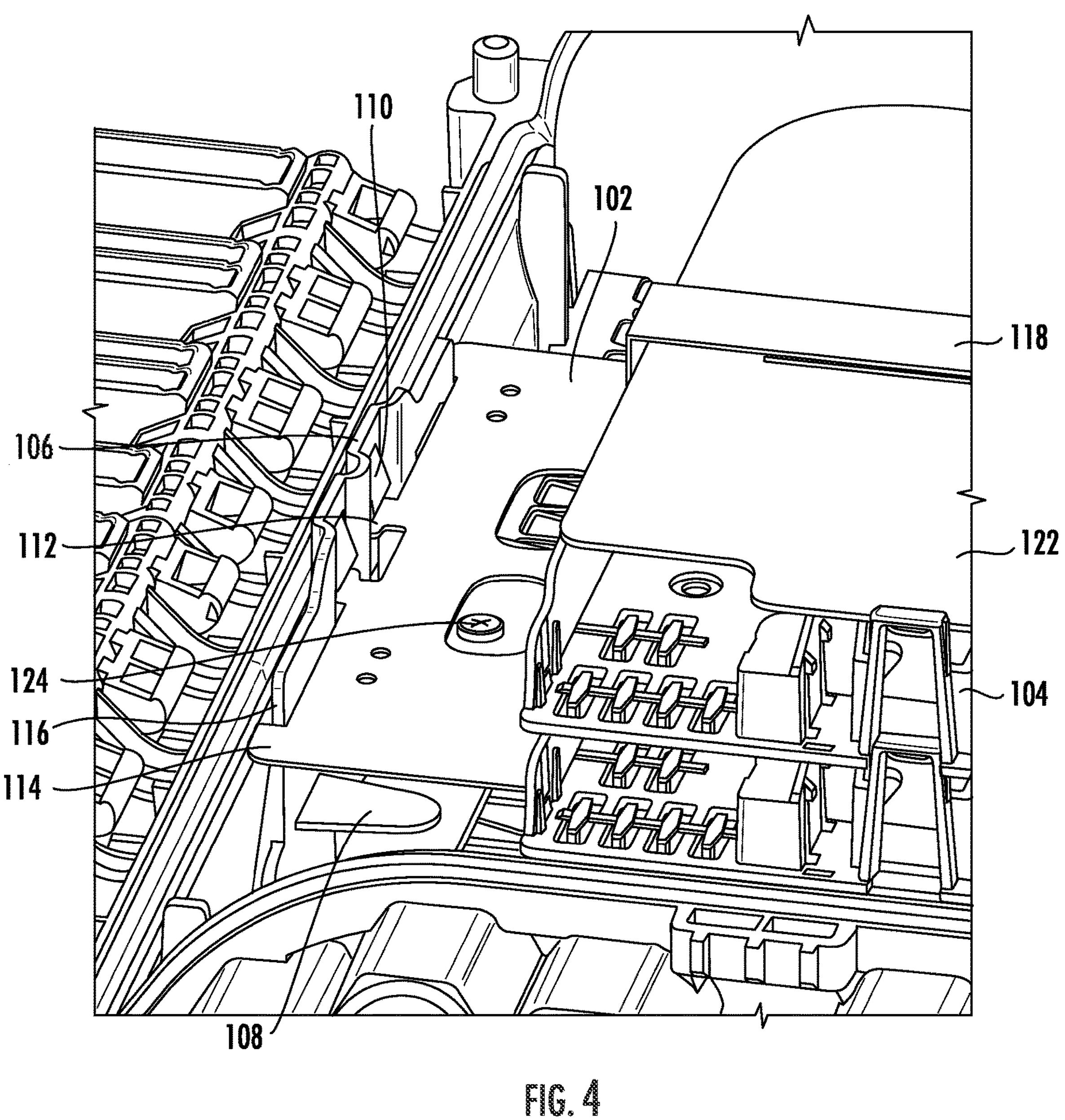
FIG. 4 illustrates a perspective view of a portion of an exemplary fiber-optic apparatus according to an embodiment with two fiber-optic storage trays received on the organizer tray.

FIG. 4 illustrates a perspective view of a portion of an exemplary fiber-optic apparatus according to an embodiment with two fiber-optic storage trays received on the organizer tray.

For brevity, only the features of the organizer 100 revealed by this view which have not been mentioned previously will be discussed. However, it should be noted that that the features of the organizer 100 discussed above in respect of FIGS. 1, 2 and 3 also apply to the organizer 100 of FIG. 4.

The view of FIG. 4 shows the centering mechanism of the organizer 100. The centering mechanism comprises four centering protrusions 114, one on each corner of the organizer tray 102. The centering protrusions 114 engage an edge 116 of the support rail 106. In alternative embodiments, the centering mechanism may comprise only one, two, three or more than four centering protrusions 114 on the organizer tray 102. The centering protrusions may also be at different locations on the organizer tray 102 such that they engage with a central portion of the support rails 106 instead of the edges 116 of the support rails 106 for example.

The view of FIG. 4 also more clearly shows the engagement feature of the organizer tray. The engagement feature of the organizer tray comprises engagement protrusions 112. The engagement protrusions 112 are shaped such that they can be inserted into and engage with the retaining members 110. In this example embodiment, there are two engagement protrusions 112 on either side of the organizer tray 102. However, in alternative embodiments there may be any number of engagement protrusions 112 on the organizer tray 102 depending on the number of retaining members 110 on each of the support rails. Furthermore, a single engagement protrusion 112 may be configured to engage with multiple retaining members 110 on the support rails.

Figure 5:
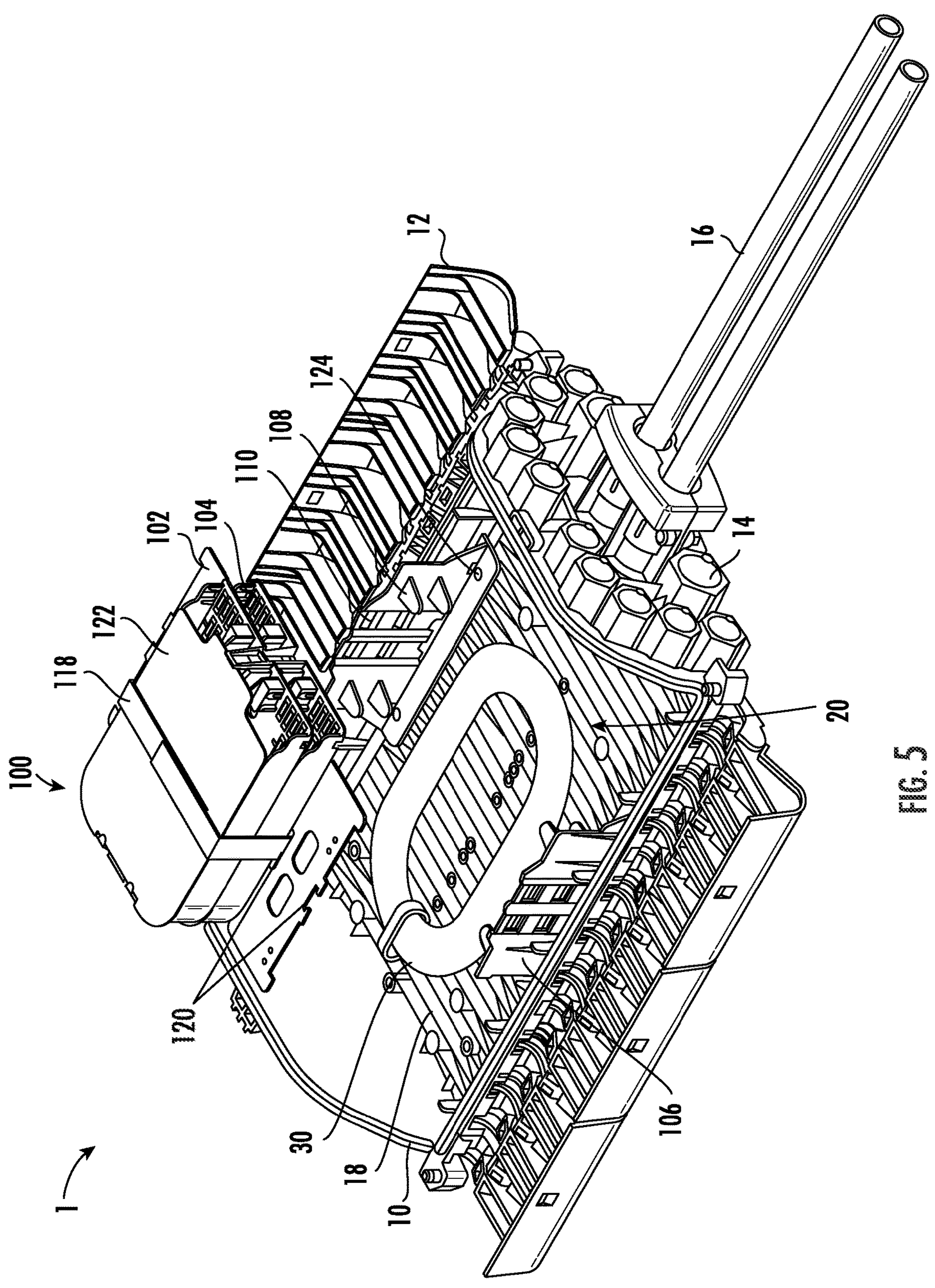
FIG. 5 illustrates a perspective view of an exemplary fiber-optic apparatus according to an embodiment with the organizer tray removed and with two fiber-optic storage trays received on the organizer tray.

FIG. 5 illustrates a perspective view of an exemplary fiber-optic apparatus according to an embodiment with the organizer tray removed and with two fiber-optic storage trays received on the organizer tray.

For brevity, only the features of the apparatus 1 and the organizer 100 revealed by this view which have not been mentioned previously will be discussed. However, it should be noted that that the features of the apparatus 1 and organizer 100 discussed above in respect of FIGS. 1, 2, 3 and 4 also apply to the apparatus 1 and organizer 100 of FIG. 5.

This view shows the organizer tray 102 with the fiber-optic management trays 104 disengaged from the support rails 106 and removed from the housing 10 of the apparatus 1. In this configuration, an operator can more easily work on the optical fibers housed in the fiber-optic management trays 104. The storage portion 20 is also more easily accessed. Therefore, the unused optical fibers 30 housed in the storage portion may be more easily accessed and connected.

In order to remove the organizer tray 102 from the organizer 100 and arrive at the configuration of FIG. 5, an operator must simply exert an upwards force on the organizer tray to deform and disengage the retaining members 110, and pull the organizer tray out of the housing 10. Alternatively, where the retaining members are clasps, fasteners, latching mechanisms or any other suitable retention mechanism, an operator may have to disengage the retaining members 110 manually or with the use of a tool. To facilitate removal of the organizer tray 102 from the organizer 100, an outward force may be exerted on the support rails 106 to elastically deform the support rails 106 and help to disengage the retaining members 110 from the organizer tray 102.

In order to insert the organizer tray 102 in the organizer 100, an operator can simply, with the organizer tray horizontal, line up the engagement protrusions 112 of the organizer tray with the retaining members 110, and the centering protrusions 114 with the edges 116 of the support rails 106 and apply downward pressure to the organizer tray to deflect the retaining members such that they snap into engagement with the engagement protrusions 112. Alternatively, an operator can insert the organizer tray 102 in the organizer 100, one side at a time. More specifically, an operator may insert one side of the organizer tray 102 in the organizer 100 at an angle to first engage the retaining members 110 on one side of the organizer tray 102 and then lower the other side of the organizer tray 102 and exert a force on the organizer tray 102 to engage the retaining members on the other side of the organizer tray 102.

Figure 6:
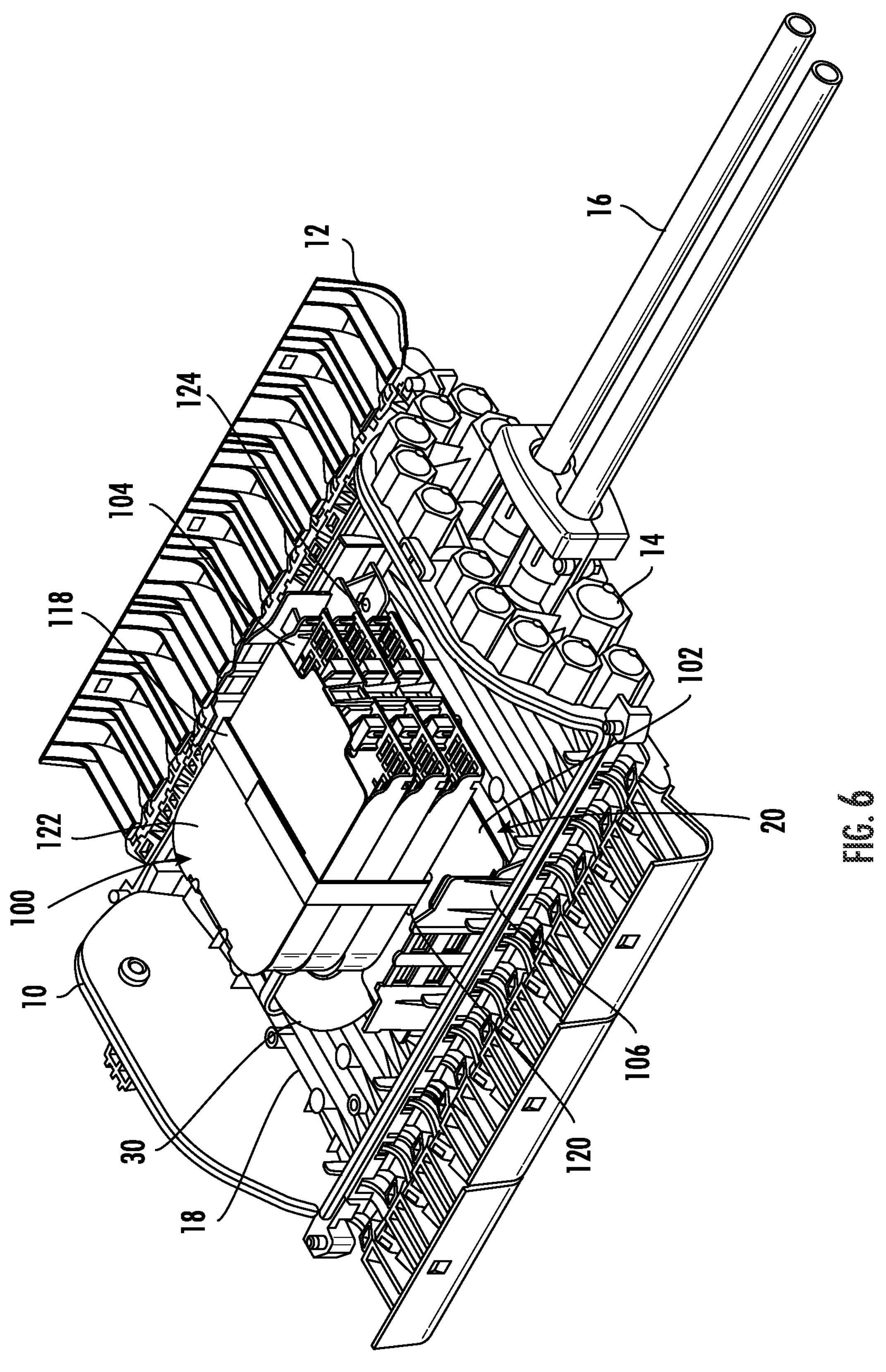
FIG. 6 illustrates a perspective view of an exemplary fiber-optic apparatus according to an embodiment with three fiber-optic storage trays received on the organizer tray.

FIG. 6 illustrates a perspective view of an exemplary fiber-optic apparatus according to an embodiment with three fiber-optic storage trays received on the organizer tray.

For brevity, only the features of the apparatus 1 and the organizer 100 revealed by this view which have not been mentioned previously will be discussed. However, it should be noted that that the features of the apparatus 1 and organizer 100 discussed above in respect of FIGS. 1, 2, 3, 4 and 5 also apply to the apparatus 1 and organizer 100 of FIG. 6.

In this example embodiment, the organizer tray is supporting three fiber-optic storage trays 104 which are retained on the organizer tray 102 with a first tape 118. The first tape 118 circumscribes the fiber-optic storage trays 104 to retain them as a bundle. The organizer 100 defines two discrete levels at which the organizer tray 102 can be retained by the support rails 106. In this example configuration, the organizer tray 102 is retained at the lower of the two discrete levels to allow space for the third fiber-optic management tray 104 in the housing 10. The supports 108 at the higher of the two discrete levels have been broken to allow the organizer tray 102 to be lowered to the lower of the two discrete levels. In this configuration, the usable volume of the storage portion 20 is reduced to accommodate the third fiber-optic management tray 104.

Figure 7A:
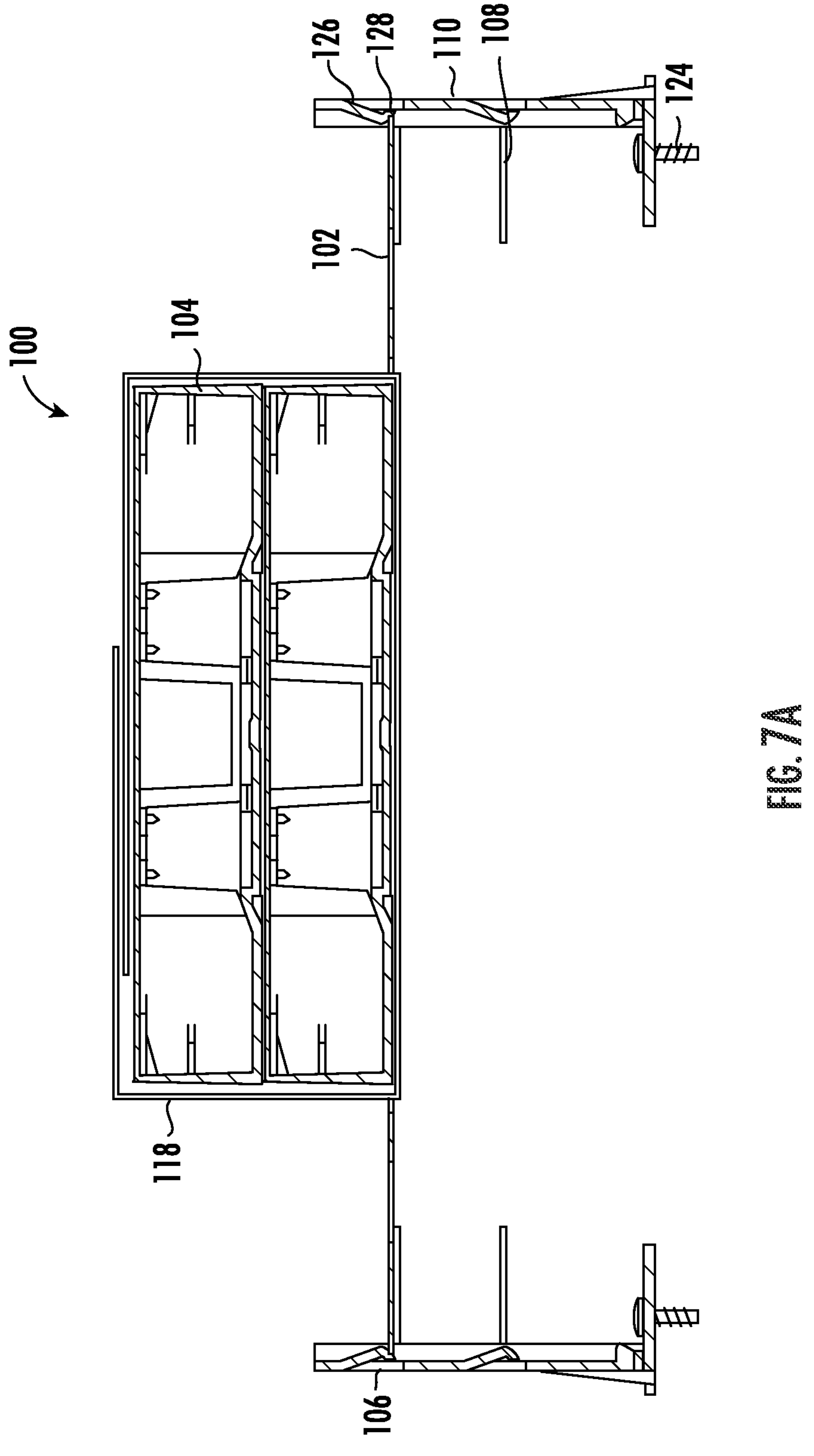
FIG. 7A illustrates a front sectional view along line 3-3 of an exemplary organizer according to an embodiment with two fiber-optic storage trays received on the organizer tray.

FIG. 7A illustrates a front sectional view along line 3-3 of an exemplary organizer according to an embodiment with two fiber-optic storage trays received on the organizer tray.

For brevity, only the features of the organizer 100 revealed by this view which have not been mentioned previously will be discussed. However, it should be noted that that the features of the organizer 100 discussed above in respect of FIGS. 1, 2, 3, 4, 5 and 6 also apply to the apparatus 1 and organizer 100 of FIG. 7A.

FIG. 7A shows a sectional view of the organizer 100 in the configuration of FIGS. 1, 2, 3 and 4. As can be seen from this sectional view of the organizer 100, the retaining members 110 are only attached to the support rail 106 at one end of the retaining member 110. The other end of the retaining members 110 is spaced away from the support rails 106 such that the retaining members 110 are resilient. The retaining members 110 have a first portion 126 which extends at an angle away from the support rails 106 towards the center of the housing 10. This first portion can guide the organizer tray 102 to the engaged position when the organizer tray 102 is being inserted into the organizer 100. The retaining members 110 also have a second portion 128 which engages with the organizer tray 102 to hold the organizer tray 102 in place when it is received in the organizer 100.

This sectional view clearly shows that the height of a discrete level is substantially the same as that of a fiber-optic management tray 104. If more than one fiber-optic management tray 104 are configured to be retained at each of the discrete levels, then the height of a discrete level may also be a factor of the height of a fiber-optic management tray 104. It will be appreciated that in alternative embodiments, the height of a discrete level may be different from the height of a single fiber-optic management tray 104 or multiple fiber-optic management trays 104.

Figure 7B:
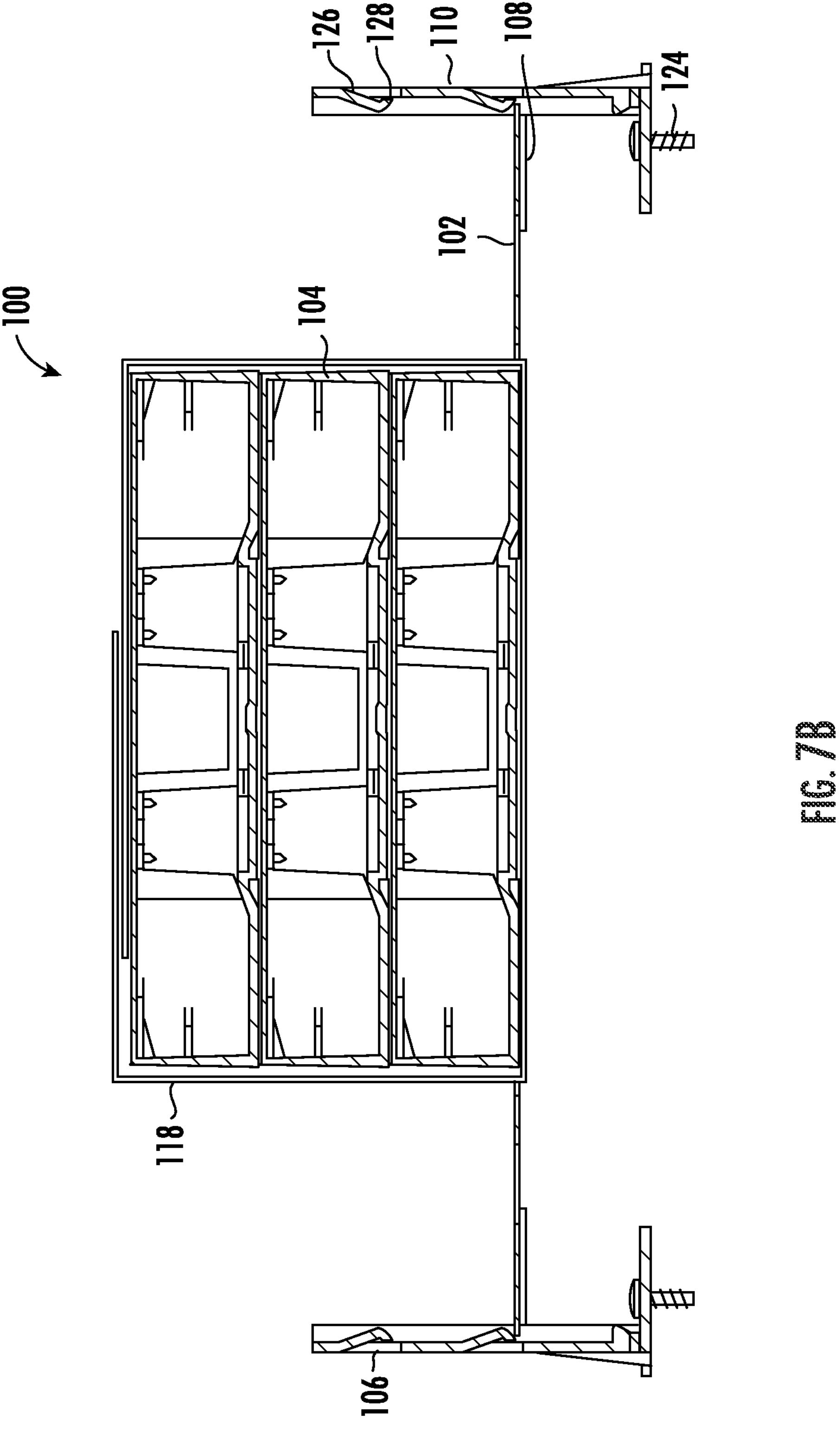
FIG. 7B illustrates a front sectional view along line 3-3 of an exemplary organizer according to an embodiment with three fiber-optic storage trays received on the organizer tray.

FIG. 7B illustrates a front sectional view along line 3-3 of an exemplary organizer according to an embodiment with three fiber-optic storage trays received on the organizer tray.

For brevity, only the features of the organizer 100 revealed by this view which have not been mentioned previously will be discussed. However, it should be noted that that the features of the organizer 100 discussed above in respect of FIGS. 1, 2, 3, 4, 5, 6 and 7A also apply to the apparatus 1 and organizer 100 of FIG. 7A.

FIG. 7B shows a sectional view of the organizer 100 in the configuration of FIG. 6. In this example the organizer 100 defines two discrete levels at which the organizer tray 102 can be retained by the support rails 106. In this example configuration, the organizer tray 102 is retained at the lower of the two discrete levels to allow space for the third fiber-optic management tray 104 in the housing 10. The supports 108 at the higher of the two discrete levels have been broken to allow the organizer tray 102 to be lowered to the lower of the two discrete levels. This view clearly shows how the usable volume of the storage portion 20 is reduced to accommodate the third fiber-optic management tray 104.

It will be appreciated that the fiber-optic management trays 104 in the figures may be of a different shape or size to those shown.

The fiber-optic apparatus described herein may be a fiber housing box, break-out box, fiber closure or splice closure. Such closures can be provided in a range of sizes, they can be deployed above grade (pole, façade) or below grade (manhole, handhole). These closures can be used, for example, for fiber-to-the-Home (FTTH) deployments and any type of optical fiber cable deployment in the outside plant. Such enclosures may be formed as a weatherproof encasement, optionally made of plastic, that envelops the exposed area between spliced cables and that can be opened to provide access to the fibers inside.

As used herein, the terms "fiber-optic cables" and/or "optical fibers" include all types of single mode and multi-mode light waveguides, including one or more optical fibers that may be uncoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multimode fiber commercially available from Corning Incorporated.

It is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fiber-optic apparatus comprising:
- a housing defining an interior;
- an access means for accessing the interior of the housing;
- at least one opening for a fiber optic cable;
- an organizer for managing one or more optical fibers in a closure, the organizer comprising:
  - an organizer tray configured to receive one or more fiber-optic storage trays; and
  - one or more support rails configured to retain the organizer tray at one of a plurality of discrete levels with respect to a base of the closure, wherein;
    - the organizer tray can be moved between the plurality of discrete levels,
    - the one or more support rails comprise one or more supports at each of the plurality of levels, each support projecting from its corresponding support rail to support the organizer tray, and
    - each support can transition between a support position, in which the support can engage with the organizer tray to support the organizer tray, into a disengaged position, in which the support does not support the organizer tray;

the fiber-optic apparatus further comprising:

a storage portion adjacent the organizer configured to retain unused optical fibers.

2. A fiber-optic apparatus according to claim 1, wherein the supports are removable or frangible.

3. A fiber-optic apparatus according to claim 1, wherein the organizer comprises a plurality of retaining members for retaining the organizer tray with respect to the one or more support rails.

4. A fiber-optic apparatus according to claim 3, wherein the plurality of retaining members are clips, clasps, fasteners, latching mechanisms or any other suitable retention mechanism.

5. A fiber-optic apparatus according to claim 3, wherein each of the plurality of retaining members is on one of the one or more support rails.

6. A fiber-optic apparatus according to claim 5, wherein each of the plurality of retaining members has a corresponding engagement feature on the organizer tray.

7. A fiber-optic apparatus according to claim 1, wherein the organizer tray is removable from the fiber-optic apparatus.

8. A fiber-optic apparatus according to claim 7, wherein the one or more support rails are resilient.

9. A fiber-optic apparatus according to claim 1, wherein the organizer comprises a centering mechanism for centering the organizer tray on the one or more support rails.

10. A fiber-optic apparatus according to claim 9, wherein the centering mechanism comprises a centering feature on the organizer tray.

11. A fiber-optic apparatus according to claim 1, wherein the organizer comprises a first tape configured to retain the one or more fiber-optic storage trays on the organizer tray.

12. A fiber-optic apparatus according to claim 11, wherein the first tape is configured to retain the one or more fiber-optic storage trays as a bundle.

13. A fiber-optic apparatus according to claim 12, wherein the organizer tray comprises cutouts to receive the first tape at different positions on the organizer tray.

14. A fiber-optic apparatus according to claim 1, wherein the organizer comprises a second tape configured to retain the organizer tray and the one or more fiber-optic storage trays received thereon on the one or more support rails.

15. A fiber-optic apparatus according to claim 11, wherein each of the one or more support rails comprises an opening for the second tape.

16. A fiber-optic apparatus according to claim 1, wherein the organizer further comprises a divider corresponding to each of the one or more fiber-optic storage trays.

17. A fiber-optic apparatus according to claim 1, wherein the height of a discrete level is substantially the same as the height of a fiber-optic storage tray.

18. A fiber-optic apparatus according to claim 1, wherein the organizer further comprises a fixing means for fixing the one or more support rails in the fiber-optic apparatus.

19. A fiber-optic apparatus according to claim 1, wherein the one or more support rails comprises:

a first support rail coupled to the base of the closure; and a second support rail coupled the base of the closure, and wherein the storage portion is at least bounded by the first support rail on a first side and the second support rail on a second side opposite the first side.

20. The fiber-optic apparatus according to claim 1, wherein the one or more support rails comprises:

a first support rail coupled to the base of the closure; and a second support rail coupled the base of the closure, wherein each of the first support rail and the second support rail include a plurality of supports at each of the plurality of levels, each support projecting from its corresponding support rail to support the organizer tray between the first support rail and the second support rail.

21. A fiber-optic apparatus comprising:

a housing defining an interior;

an access means for accessing the interior of the housing;

at least one opening for a fiber optic cable;

an organizer for managing one or more optical fibers in a closure, the organizer comprising:

an organizer tray configured to receive one or more fiber-optic storage trays; and a first support rail and a second support rail coupled to a base of the closure and configured to retain the organizer tray at one of a plurality of discrete levels with respect to the base of the closure, wherein:

the organizer tray can be moved between the plurality of discrete levels, each of the first support rail and the second support rail comprise a plurality of supports at each of the plurality of discrete levels, each support projecting from its corresponding support rail to support the organizer tray between the first support rail and the second support rail;

the fiber-optic apparatus further comprising:

a storage portion adjacent the organizer configured to retain unused optical fibers.

22. A fiber-optic apparatus according to claim 21, wherein the plurality of supports are removable or frangible.

* * * * *